US011332560B2

(12) United States Patent
Weydert et al.

(10) Patent No.: US 11,332,560 B2
(45) Date of Patent: May 17, 2022

(54) ANIONIC POLYMERIZATION OF ALPHA-METHYLSTYRENE/STYRENE ALTERNATING COPOLYMER

(71) Applicants: The Goodyear Tire & Rubber Company, Akron, OH (US); Luxembourg Institute of Science and Technology, Esch-sur-Alzette (LU)

(72) Inventors: Marc Weydert, Bertrange (LU); Laurent Albert Robert Poorters, Schieren (LU); Pierre Verge, Esch-sur-Alzette (LU); Arnaud Wolf, Esch-sur-Alzette (LU); Reiner Dieden, Esch-sur-Alzette (LU)

(73) Assignees: The Goodyear Tire & Rubber Company, Akron, OH (US); Luxembourg Institute of Science and Technology, Luxembourg (LU)

( * ) Notice: Subject to any disclaimer, the term of this patent is extended or adjusted under 35 U.S.C. 154(b) by 80 days.

(21) Appl. No.: 15/930,578

(22) Filed: May 13, 2020

(65) Prior Publication Data
US 2020/0362076 A1    Nov. 19, 2020

Related U.S. Application Data

(60) Provisional application No. 62/848,017, filed on May 15, 2019.

(51) Int. Cl.
*C08F 212/08* (2006.01)
*C08K 5/56* (2006.01)

(52) U.S. Cl.
CPC .............. *C08F 212/08* (2013.01); *C08K 5/56* (2013.01)

(58) Field of Classification Search
CPC ........ C08F 212/12; C08F 212/08; C08F 4/48; C08K 5/56

USPC .......................................................... 526/79
See application file for complete search history.

(56) References Cited

U.S. PATENT DOCUMENTS

| 3,879,495 | A | 4/1975 | Fujii et al. |
| 7,026,406 | B1 | 4/2006 | Kawabe et al. |
| 7,671,132 | B1 | 3/2010 | Thielen et al. |
| 7,781,552 | B2 * | 8/2010 | Ebara .................... C08F 297/04 526/347.1 |
| 2017/0051135 | A1 | 2/2017 | Sandstrom et al. |

FOREIGN PATENT DOCUMENTS

| EP | 0743341 A1 | 11/1996 |
| EP | 2412731 A1 | 2/2012 |
| JP | 2009155473 A | 7/2009 |

OTHER PUBLICATIONS

Moritani and Fujiwara, 13C- and 1H-NMR Investigations of Sequence Distribution in Vinyl Alcohol-Vinyl Acetate Copolymers, Vinyl Alcohol-Vinyl Acetate Copolymers, May-Jun. 1977, vol. 10, No. 3, pp. 532-535, Macromolecules.
P. Phalip, et al, Synthesis and Thermal Analysis of Styrene and a-Methylstyrene Multiblock Copolymers, Polymer Bulletin, Jan. 1, 1984, pp. 331-335, vol. 12, No. 4.
Puskas et al., Quasiliving Carbocationic Polymerization. IX. Forced Ideal Copolymerization of Styrene Derivatives, Journal of Macromolecular Science: Part A—Chemistry, 1982-83, A18(9), pp. 1315-1338.
Qian Liu, et al, Copolymerization of a-Methylstyrene and Styrene*, Chinese Journal of Polymer Science, Jun. 26, 2014, pp. 986-995, vol. 32, No. 8.

* cited by examiner

*Primary Examiner* — Hui H Chin
(74) *Attorney, Agent, or Firm* — John D. DeLong

(57) ABSTRACT

The present invention is directed to a copolymer of styrene and α-methylstyrene comprising an alternating sequence of styrene and α-methylstyrene residues, and a method to make the copolymer.

10 Claims, 3 Drawing Sheets

ANIONIC POLYMERIZATION OF ALPHA-METHYLSTYRENE/STYRENE ALTERNATING COPOLYMER

TECHNICAL FIELD OF THE INVENTION

The present invention is directed to a copolymer of styrene and α-methylstyrene comprising an alternating sequence of styrene and α-methylstyrene (AMS) residues. Moreover, the present invention is drawn to a method of polymerizing an alternating copolymer of styrene and α-methylstyrene. The present invention is also directed to a rubber composition including such a copolymer and the use of such a copolymer in rubber components, in particular tires.

BACKGROUND

α-Methylstyrene/styrene copolymers (AMS/S) have been intensively investigated by the scientific and industrial communities due to their high heat distortion temperature and enhanced mechanical properties compared to polystyrene alone. AMS/S can be polymerized by radical, cationic or anionic techniques to give a range of compositions as well as molecular weight and sequence distributions (see e.g., Liu et al., Chin. J. Polym. Sci. 32, 986-995 (2014); Puskás et al., J. Macromol. Sci. Part—Chem. 18, 1315-1338 (1982); Phalip et. al., Polym. Bull. 12, 331-335 (1984)). While the syntheses of block and random AMS/S copolymers have been described, to the best of our knowledge alternating copolymers of AMS/S have never been reported. One of the main reasons for this is associated with the characterization of such copolymers, the chemical structures of styrene and alphamethylstyrene being too similar to differentiate them by traditional techniques.

SUMMARY OF THE INVENTION

One object of the invention may be to provide a new AMS/S copolymer with an essentially defined chemical structure and/or a method of making such a copolymer.

The present invention is defined by the appended independent claims. Preferred embodiments are mentioned in the dependent claims and in the description hereinbelow.

Thus, in a first aspect the present invention is directed to a copolymer of styrene and α-methylstyrene comprising an essentially alternating sequence of styrene and α-methylstyrene residues. Preferably, the copolymer has a binary monomer sequence coefficient $\chi$ where $1.4 \leq \chi \leq 2$. Said binary monomer sequence is further described hereinbelow.

In one embodiment, molecular weight Mw of the copolymer is in a range of from 500 to 10000, or 1000 to 10000, or 500 to 5000 (g/mol). Preferably, Mw is within a range of 1000 to 4500. Mw (weight average molecular weight) is determined using Matrix Assisted Laser Desorption/Ionization (MALDI) and/or Time of Flight (TOF) Mass spectroscopy (MS) according to ASTM D7134-05.

The present invention takes also advantage of a low ceiling temperature of AMS (which is within a range of 60° C. to 63° C., preferably within a range of 61° C. to 62° C.) to synthesize alternating AMS/S copolymers, preferably with a range of explicitly chosen molecular weights Mw, preferably in a range of 500 to 10000 (or even more preferably between 1000 and 4500) g/mol. Preferably, polydispersity is within a range of 1.0 to 1.3. Such a relatively narrow polydispersity allows more accurate alternation characterization.

In another embodiment, the copolymer has a $\chi$ with $1.5 \leq \chi \leq 2$, preferably $1.6 \leq \chi \leq 2$.

In a second aspect, the present invention is directed to a method of polymerizing an alternating copolymer of styrene and α-methylstyrene alternating polymers of styrene and AMS (such as described above), comprising the steps of:

adding butyllithium to a solution containing α-methylstyrene, wherein the solution is maintained in the range of 60° C. to 63° C., preferably within a range of 61° C. to 62° C.; and alternately and/or successively adding essentially equimolar amounts of styrene and α-methylstyrene to produce the copolymer. Preferably, equimolar amounts shall be understood to be equal molar amounts with a maximum deviation of 5%, preferably less deviation than 2%, from one another.

In an embodiment, the molecular weight Mw of the copolymer is in a range of from 500 to 10000, preferably in the range of from 1000 to 4500.

In another embodiment, the copolymer has a binary monomer sequence coefficient $\chi$ where $1.4 \leq \chi \leq 2$, preferably $1.5 \leq \chi \leq 2$, or even more preferably $1.6 \leq \chi \leq 2$.

In another embodiment, all reactants are degassed before the polymerization.

In another embodiment, all reaction vessels are dried and/or provided moisture and/or oxygen free before the polymerization is carried out.

All aspects and embodiments as well as features mentioned in the description hereinbelow may be combined with one another.

DESCRIPTION

Figure 1:
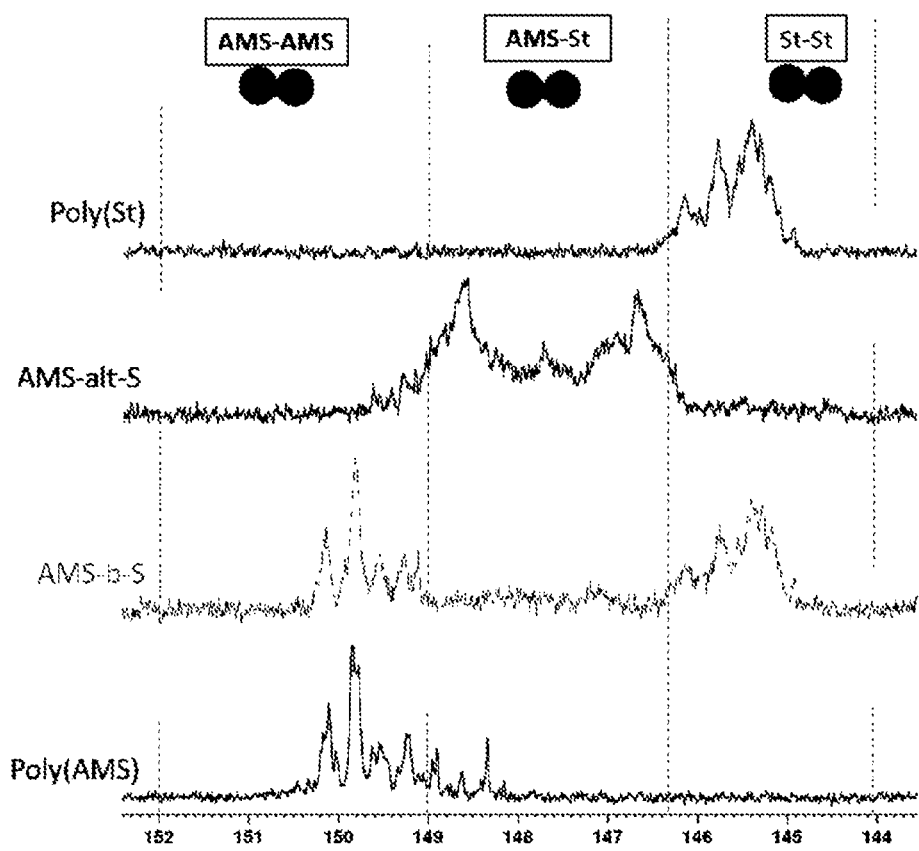
FIG. 1 shows a q$^{13}$C NMR spectrum of poly(AMS) standard, poly(S) standard and synthetized poly(AMS/S).

There is disclosed a copolymer of styrene and α-methylstyrene comprising an alternating sequence of styrene and α-methylstyrene residues, and a method to make the copolymer.

The copolymer may be characterized using statistical binary sequence distribution based on monomer diad probabilities as described in Moritani et al., Macromolecules Vol 10, No. 3 (May-June 1977), p 532-535. As applied to the copolymer of styrene and α-methylstyrene, relevant monomer diads in the copolymer are

| MSt\MSt | α-methylstyrene\α-methylstyrene diad |
| MSt\St | α-methylstyrene\styrene diad |
| St\St | styrene\styrene diad |

The probability of α-methylstyrene P{MSt} and styrene P{St} occurring in the copolymer is given by $$P\{MSt\}=P\{MSt\backslash MSt\}+P\{MSt\backslash St\}/2$$

$$P\{St\}=1-P\{MSt\}$$

where P{MSt/MSt} is the probability of a α-methylstyrene/α-methylstyrene diad in the copolymer, and P{MSt/St} is the probability of a α-methylstyrene/styrene diad in the copolymer, as measured or determined for example by $^{13}$C NMR.

A binary monomer sequence coefficient χ for the copolymer is defined as $$\chi = \frac{P\{MSt \backslash MSt\}}{2 * P\{MSt\} * P\{St\}} * 100$$

The binary monomer sequence coefficient is useful to characterize the monomer sequence distribution in binary copolymers, where $0 \leq \chi \leq 1$ stands for blocky distributions, $\chi=1$ stands for completely random distribution, and $1<\chi\leq2$ stands for alternating-like distributions, and $\chi=2$ stands for a completely alternating distribution.

For the copolymer of styrene and α-methylstyrene comprising an alternating sequence of styrene and α-methylstyrene residues, in one embodiment, the copolymer has a binary monomer sequence coefficient χ where $1.4<\chi\leq2$. In another embodiment, $1.5\leq\chi\leq2$. In still another embodiment, $1.6\leq\chi\leq2$.

The procedure that takes advantage of the low ceiling temperature of AMS to synthesize alternating AMS/S copolymers, in particular within the range of suggested molecular weights and/or preferably limited polydispersity. The level of control achieved over structure and chemical composition was also assessed via quantitative $^{13}$C nuclear magnetic resonance (q$^{13}$C NMR) and selective heteronuclear multiple bond correlation 2-dimensional NMR (SHMBC NMR) focused on the aromatic quaternary carbons of S and AMS. These techniques were used to calculate diad probabilities (AA-AS-SS) and to extract AMS/S sequence information. In addition, high-resolution mass spectrometry (HR-MS) and tandem mass spectrometry (MS/MS) were used to characterize these materials, and provide confirmation, consistent with NMR results, that well-defined AMS-alt-S copolymers have been synthesized successfully.

Thus, the procedure prepares essentially alternating copolymers of alphamethylstyrene (AMS) and styrene by anionic polymerization. In order to achieve (almost) perfectly alternating polymers of styrene and AMS, the polymerization is preferably carried out at the ceiling temperature of AMS. First, butyllithium is added to a solution containing AMS, the active species is formed, but no further polymerization takes place at the ceiling temperature. Through successive additions of equimolar amounts of styrene, styrene is incorporated alternatingly into the polymer chain, followed by another AMS monomer.

An example procedure for a 10 ml batch is presented right below:

1. A Schlenck flask or 3-necks round flask is dried under vacuum with a heat gun blower in order to remove moisture from the wall (or drying oven 80° C. overnight).
2. 3 cycles of Ar-Vacuum are run out to refill the apparatus with inert gas.
3. Solvents are taken out of the MBRAUN SPS and stored over 4 Å activated molecular sieves (Cyclohexane & THF are distilled over Na/benzophenone), monomers are purified by reduced-pressure distillation under CaH$_2$ and stored in fridge at 2° C.
4. In a Schlenck flask and according to Schlenck techniques, cyclohexane, 10% v of THF and 0.1 M of AMS are introduced with syringes purged with argon.
5. Solution is then degassed according to freeze-pump-thaw procedure.
6. Separately, an equimolar solution of AMS and S are mixed in a dried round flask in order to prepare the monomer feeding solution.
7. Monomer feeding solution are also degassed according the freeze-pump-thaw procedure separately.
8. A certain amount of monomer feeding solution are taken out by a gastight Hamilton syringe and are placed on the syringe pump in order to add the monomers feeding directly above the reaction solution.
9. When all the reagents are properly oxygen- and moisture-free, the main solution is set up to 61° C. with an oil bath which is the reaction temperature.
10. The polymerization is initiated by adding a certain amount of n-BuLi 2.5 M in hexane, in the reaction media.
11. After 5 min of reaction, a first equimolar batch of a certain amount of monomer feeding solution is added (calculated amount according to n-BuLi added, in order to add one St unit every batch).
12. Every 5 min, a number of batches are added in order to increase the molecular weight of the final polymer.
13. After a certain amount of batches, the reaction is quenched with an excess of anhydrous MeOH.
14. The polymer is then precipitated in a 3:1 (v/v) MeOH/isopropanol solution
15. The polymer is recovered by filtration washed with MeOH and then dried in a 80° C. vacuum bell at least during 24 h.

Alternative techniques for specific steps may be used, for example chromatography for polymer separation as is known in the art.

The manufactured resin may be used for example in the preparation of high impact polystyrene (HIPS) or as a resin, in particular a tackifying resin, in rubber compositions.

Figure 2:
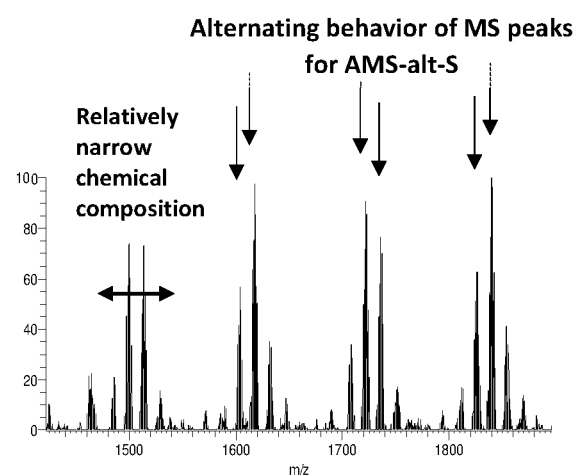
FIG. 2 shows an MS spectrum of AMS-alt-S showing narrow chemical composition and alternative behavior for every degree of polymerization.

A sample of an alternating AMS/S copolymer was made following the above procedure using a 1:1 monomer ratio. Additionally samples were prepared for the styrene homopolymer, AMS homopolymer, a random copolymer (1:1 monomer ratio) and block copolymer (1:1 monomer ratio). The samples were analyzed using NMR and mass spectrometry with results shown in FIGS. 1 and 2.

The monomer diad probabilities were determined or measured using $^{13}$C NMR and corresponding values for χ were calculated as given before, with results in Table 1.

TABLE 1

| Copolymer | P{MSt\MSt} | P{Mst\St} | P{St\St} | P{MSt} | P{St} | χ |
|---|---|---|---|---|---|---|
| Polystyrene | 0 | 0 | 100 | 0 | 100 | — |
| MSt-alt-St | 12 | 83 | 5 | 50 | 50 | 1.66 |
| MSt-random-St | 16 | 57 | 28 | 50 | 50 | 1.14 |
| MSt-block-St | 36 | 26 | 46 | 50 | 50 | 0.52 |
| Poly(α-methylstyrene) | 100 | 0 | 0 | 100 | 0 | — |

Figure 3:
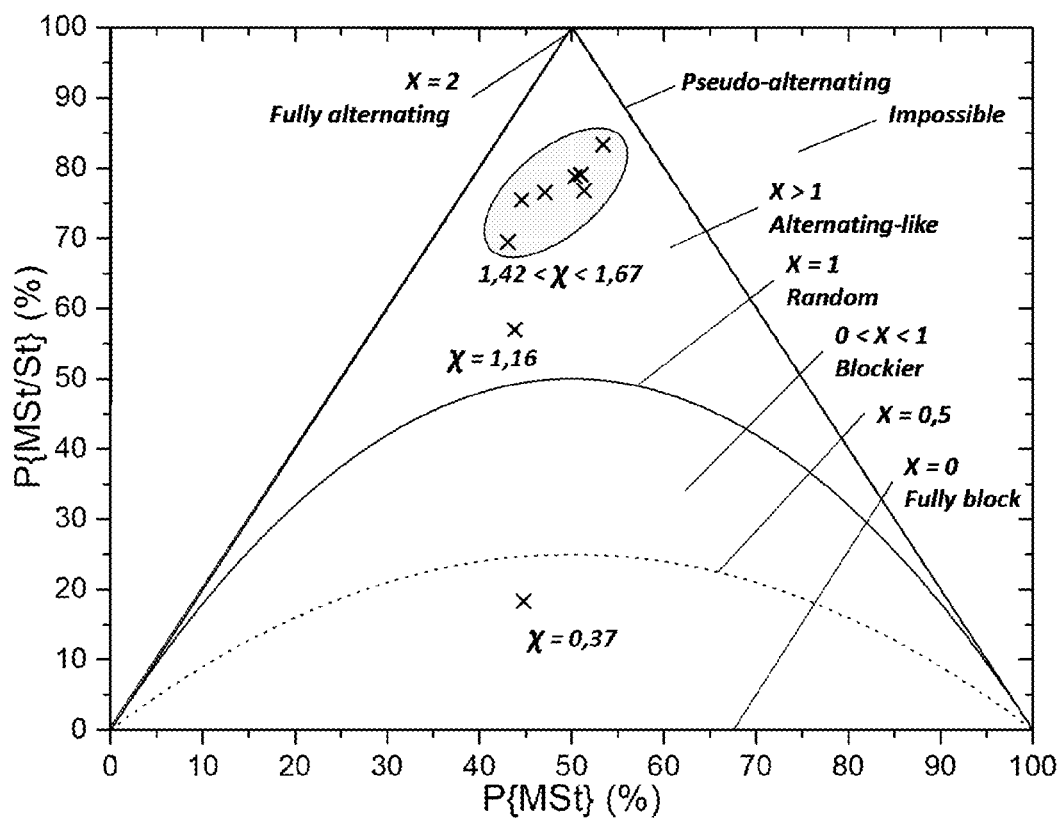
FIG. 3 shows a plot of the binary monomer sequence coefficient for copolymers made according to the invention.

The values of $\chi$ for several polymer samples are given in a plot in FIG. 3 as described in Moritani et al., Macromolecules Vol 10, No. 3 (May-June 1977), p 532-535. As seen in FIG. 3, copolymers of styrene and α-methylstyrene made using the method of the current invention consistently show a binary sequence coefficient characteristic of an highly alternating copolymer.

What is claimed is:

1. A copolymer of styrene and α-methylstyrene comprising an alternating sequence of styrene and α-methylstyrene residues, wherein the copolymer has a binary monomer sequence coefficient $\chi$ where $1.4 \leq \chi \leq 2$ and molecular weight Mw in a range of 500 to 10000 g/mol.

2. The copolymer of claim 1, wherein the molecular weight Mw of the copolymer ranges from 1000 to 4500 g/mol.

3. The copolymer of claim 1 wherein $1.5 \leq \chi \leq 2$.

4. The copolymer of claim 1 wherein $1.6 \leq \chi \leq 2$.

5. A method of polymerizing an alternating copolymer of styrene and α-methylstyrene comprising the steps of:

adding butyllithium to a solution containing α-methylstyrene, wherein the solution is maintained in a range of 60° C. to 63° C.; and alternately and successively adding essentially equimolar amounts of styrene and α-methylstyrene to produce the copolymer.

6. The method of claim 5, wherein the molecular weight Mw of the copolymer is in a range of from 500 to 10000 g/mol.

7. The method of claim 5, wherein the molecular weight Mw of the copolymer is in a range of from 1000 to 4500 g/mol.

8. The method of claim 5, wherein the copolymer has a binary monomer sequence coefficient $\chi$ where $1.4 \leq \chi \leq 2$.

9. The method of claim 5, wherein the copolymer has a binary monomer sequence coefficient $\chi$ where $1.5 \leq \chi \leq 2$.

10. The method of claim 5, wherein the copolymer has a binary monomer sequence coefficient $\chi$ where $1.6 \leq \chi \leq 2$.

* * * * *